US010585591B1

(12) United States Patent
Khokhar et al.

(10) Patent No.: US 10,585,591 B1
(45) Date of Patent: Mar. 10, 2020

(54) CONFIGURING A DATA STORAGE SYSTEM BASED ON WORKLOAD SKEW

(71) Applicant: EMC IP Holding Company LLC, Hopkinton, MA (US)

(72) Inventors: Muzhar S. Khokhar, Shrewsbury, MA (US); Shyam Reddy, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 455 days.

(21) Appl. No.: 15/394,134

(22) Filed: Dec. 29, 2016

(51) Int. Cl.
*G06F 3/06* (2006.01)
*G06F 9/445* (2018.01)

(52) U.S. Cl.
CPC ............ *G06F 3/061* (2013.01); *G06F 3/0604* (2013.01); *G06F 3/067* (2013.01); *G06F 3/0631* (2013.01); *G06F 3/0632* (2013.01); *G06F 3/0659* (2013.01); *G06F 3/0665* (2013.01); *G06F 3/0683* (2013.01); *G06F 9/44505* (2013.01); *G06F 2212/154* (2013.01); *G06F 2212/163* (2013.01); *G06F 2212/222* (2013.01)

(58) Field of Classification Search
CPC ...... G06F 3/061; G06F 3/0631; G06F 3/0653; G06F 3/0613; G06F 3/0629; G06F 3/0689; G06F 3/0683
See application file for complete search history.

(56) References Cited

U.S. PATENT DOCUMENTS 8,433,848 B1 4/2013 Naamad et al.
2007/0174672 A1 7/2007 Benhase et al.
2011/0072225 A1 3/2011 Kawaguchi et al.
2015/0277781 A1* 10/2015 Maruyama ............ G06F 3/0611 711/114

OTHER PUBLICATIONS

Oracle, "How to Configure Oracle FS1-2 Storage Based on Data Skew; the Most Important New Metric in Array Configurations", Feb. 2015, pp. 1-19.
EMC, "EMC VNX FAST VP—a Detailed Review", Dec. 2013, pp. 1-25.

* cited by examiner

*Primary Examiner* — Reginald G Bragdon
*Assistant Examiner* — Thanh D Vo
(74) *Attorney, Agent, or Firm* — BainwoodHuang

(57) ABSTRACT

Techniques for configuring multi-tier data storage systems provide a model of skewed workload distributions in such systems and configure them by applying a received input skew value representing a prediction of system skew and the model. The technique applies the input skew value to generate a desired proportion of total system IOPS to be handled by each storage tier in the system and applies the model to convert the IOPS percentage for each storage tier into a corresponding capacity percentage. The technique then generates actual capacity for each tier by applying the percent capacity for each tier to a design target for total storage capacity in the system. Advantageously, these techniques generate storage tier configurations that are likely to be neither overdesigned nor underdesigned, and are thus (Continued)

Data storage system 100
Storage 102
TIER 104(1)
TIER 104(2)
...
TIER 104(N)
Storage Processor 106

Computing Device 110
Processing Circuitry 112
Memory 114
Storage Configuration Tool 116
Skew Model 120 likely to meet both performance requirements and cost targets.

18 Claims, 6 Drawing Sheets

LOOKUP TABLE 420

| SKEW VALUE | PARAMETER (k) |
|---|---|
| 0.50 | 0.0 |
| ... | ... |
| 0.55 | 0.5 |
| ... | ... |
| 0.77 | 2.5 |
| .... | ... |

MATRIX 430

432

434

| CAPACITY | k = 0.00 | k = 0.50 | k = 2.5 |
|---|---|---|---|
| 0.10 | 0.10 | 0.11 | 0.27 |
| ... | ... | ... | ... |
| 0.23 | 0.23 | 0.25 | 0.77 |
| ... | ... | ... | ... |
| 0.45 | 0.45 | 0.55 | 0.93 |
| ... | ... | ... | ... |
| 0.50 | 0.50 | 0.59 | 0.95 |

*FIG. 4*

CONFIGURING A DATA STORAGE SYSTEM BASED ON WORKLOAD SKEW

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Some data storage systems use an assortment of data storage devices. Such data storage devices may have different performance characteristics and may be provided in respective storage tiers, with each storage tier including multiple storage devices that have similar characteristics. Each storage tier may contain a certain amount of data storage capacity, e.g., measured in gigabytes, terabytes, etc., and may include some number of storage drives to meet that capacity. As used herein, a "storage drive" is a physical device that stores data, such as an electronic flash drive, a SAS (Serial Attached SCSI—Small Computer System Interface) drive, an NL-SAS (Near Line SAS) drive, or a SATA (Serial Advanced Technology Attachment) drive, for example.

Data storage systems commonly have imbalanced, or skewed, distributions in the frequency with which various data elements are accessed. For example, in systems with high levels of skew, a small percentage of data elements are the target of a large percentage of IOPS (input/output operations per second).

SUMMARY

Unfortunately, conventional methods of configuring multi-tier data storage systems are imprecise. Imprecisely configured systems may employ too little high-performance storage and thus may fail to meet performance requirements. They may also employ too much high-performance storage and thus may fail to meet cost targets.

In contrast with prior approaches, an improved technique for configuring multi-tier data storage systems provides a model of workload distributions in data storage systems and configures a multi-tier data storage system by applying a received input skew value and the model. The input skew value represents a prediction of system skew in the multi-tier data storage system based on an expected workload profile of that system. The technique applies the input skew value to generate a desired proportion of total system IOPS to be handled by each storage tier in the system and applies the model to convert the IOPS percentage for each storage tier into a corresponding capacity percentage. The technique then generates actual capacity for each tier by applying the percent capacity for each tier to a design target for total storage capacity in the system. Advantageously, the improved technique generates storage tier configurations that are likely to be neither overdesigned nor underdesigned, and are thus likely to meet both performance requirements and cost targets.

Certain embodiments are directed to a method of configuring a data storage system. The method includes receiving a skew value, the skew value based on expected workload profile of the data storage system to be configured, and a desired storage capacity of the data storage system. The method further includes generating, based on the received skew value, a respective IOPS (input-output operations per second) percentage to be handled by each of multiple storage tiers, each storage tier to be formed by a respective set of storage devices and having respective performance characteristics. The method further includes mapping each IOPS percentage to a corresponding capacity percentage of storage capacity in the data storage system and then generating a total storage capacity for each storage tier based on the capacity percentage for that storage tier and the desired storage capacity of the data storage system. The method still further includes installing storage devices for each storage tier in the data storage system to provide the total storage capacity for each storage tier.

Other embodiments are directed to a computer program product. The computer program product stores instructions which, when executed by control circuitry of a computer system, cause the computer system to perform a method of configuring a data storage system, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

FIG. 4 shows an example lookup table associating skew values with respective model parameters and an associated matrix derived from the lookup table which are used in embodiments disclosed herein.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

Figure 1:
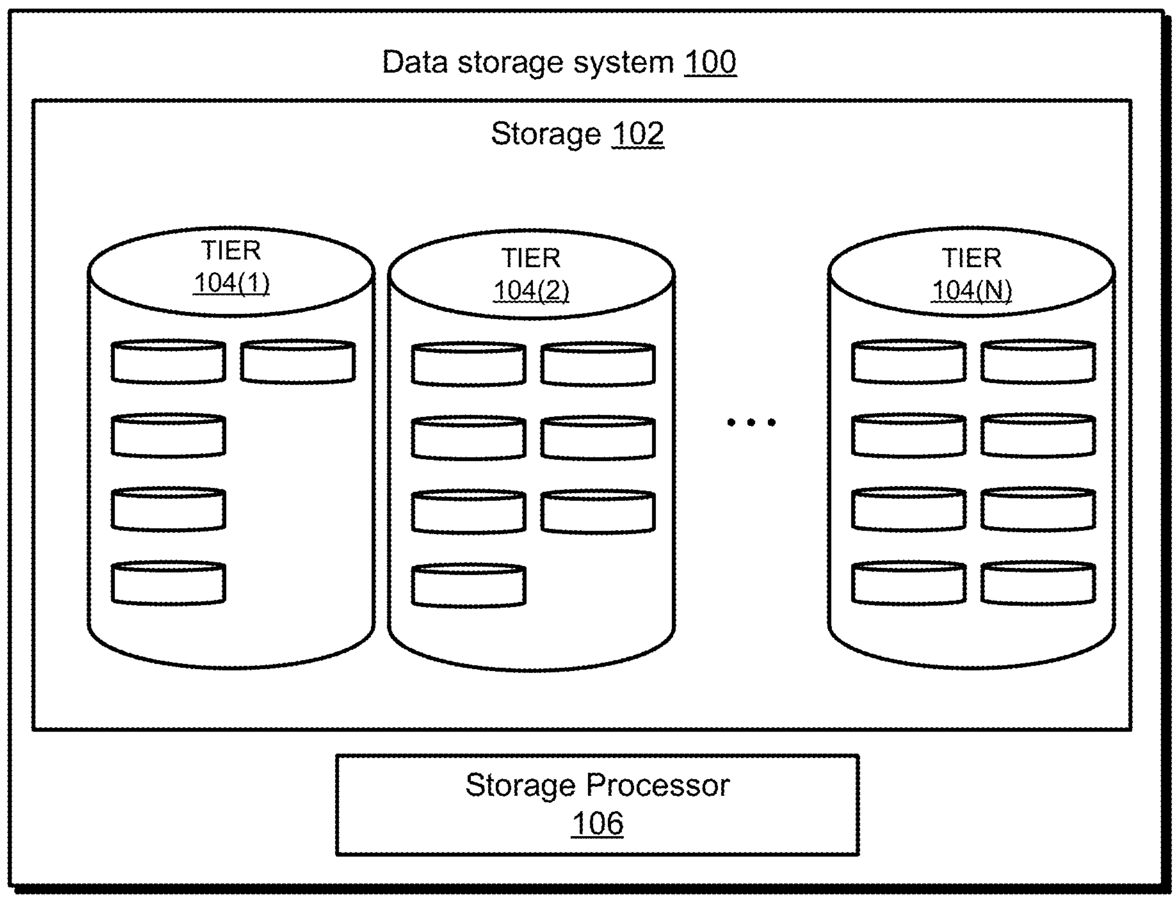
FIG. 1 is a block diagram of an example data storage system with multiple tiers of storage and of an example computer used to configure the data storage system.
Figure 1:
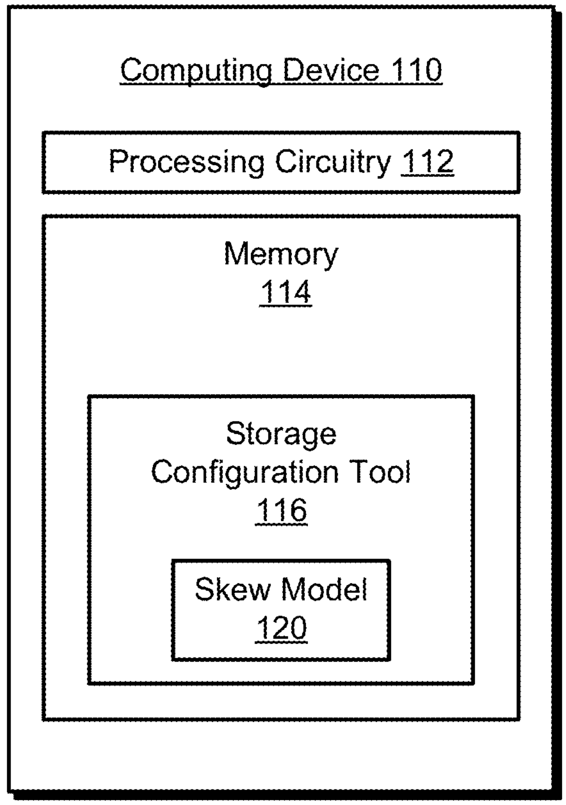

An improved technique for configuring multi-tier data storage systems provides a model of workload distributions in data storage systems and configures a multi-tier data storage system by applying a received input skew value and the model. Storage tier configurations generated using the improved technique are likely to be neither overdesigned nor underdesigned, and are thus likely to meet both performance requirements and cost targets FIG. 1 shows an example computing device 110 in which embodiments of the improved technique hereof can be practiced. FIG. 1 also shows an example tiered data storage system 100. The computing device 110 includes processing circuitry 112 and memory 114. The processing circuitry 112 may include one or more processing cores, chips, or assemblies. The memory 114 may be provided as both volatile and non-volatile memory. The computing device 110 may be implemented using any electronic device or machine capable of running software, such as a desktop computer, laptop computer, tablet computer, smart phone, and so forth.

The memory 114 "includes," i.e., realizes by operation of software instructions, a storage configuration tool 116, which includes or otherwise has access to a skew model 120. Users of the computing device 110 can operate the storage configuration tool 116 to generate configurations for particular data storage systems, e.g., the system 100, by applying the model 120 and an input value of expected skew of the data storage system.

It should be understood that the techniques disclosed herein are applied to systems with two or more storage tiers and are not limited to any particular number of storage tiers. The data storage system 100 represents a system that is either being designed initially or that is being reconfigured, e.g., in an effort to repurpose the data storage system 100 for supporting a different application or set of applications. For simplicity, this document will hereafter refer to the data storage system 100 as something that actually exists, rather than as a design of a prospective system.

The data storage system 100 is seen to include storage 102 and a storage processor 106. The storage 102 includes storage tiers 104 (i.e., tiers 104(1) through 10 (N)). Each storage tier is composed of storage devices, such as magnetic disk drives, electronic flash drives, or the like. Each storage tier 104 has respective performance characteristics. Different storage tiers are distinguished from one another by their performance characteristics. For example, on storage tier may be composed of flash drives, another of SAS drives, and yet another of NL-SAS drives.

Figure 2A:
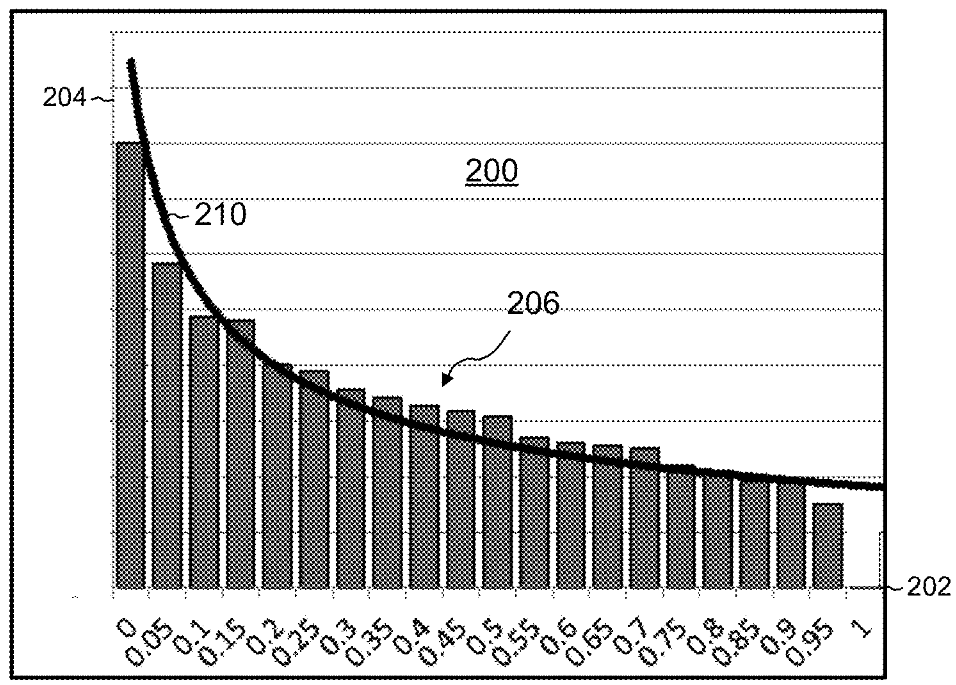
FIG. 2A is a graph showing an example relationship between IOPS (I/Os Per Second) and units of storage capacity in a data storage system.

FIG. 2A shows a graph 200 of the workload of an actual data storage system and a workload distribution 210 related to the workload. Percent increments of storage capacity are shown on horizontal axis 202, and percent increments in IOPs are shown on the vertical axis 204. Each bar 206 indicates a portion of total IOPS in the system directed to the corresponding portion of storage. For example, the height of each bar 206 indicates the relative frequency at which IO requests in the system access the corresponding increment of storage, with the sum of heights of all bars representing all of the IOPS in the system. The total of all increments of storage along the horizontal axis 204 represents all of the storage in the system. For instance, the figure depicts a system with 20 units of storage where each unit of storage forms 5% of the total capacity of the system. The bars 206 are ranked from tallest to shortest along the horizontal axis 202. The storage increments shown along the horizontal axis are not intended to correspond to particular disk drives. Rather, they may be regarded as extents of storage, which may be represented at any desired level of granularity and in any number.

In accordance with the skew model 120 (FIG. 1), a workload distribution 210 approximates the distribution of IOPS shown by bars 206 using a continuous curve. Thus, while bars 206 represent actual, discrete values of IOPS for corresponding percent capacity increments, workload distribution 210 approximates the same values as a continuous function.

In an example, the shape of the workload distribution 210 is defined by the skew model 120 and takes the general form $y=1/x^k$, which indicates a power law relationship between IOPS (presumed to be along the y-axis) and storage capacity (presumed to be along the x-axis), where 'k' is a parameter that may be adjusted to simulate different levels of skew. The shape of the workload distribution 210 depends on the value of k. For example, k=0 would correspond to a horizontal line, which means that IOPS are distributed evenly across all units of storage. Increasing values of k>0 result in steeper decay rates and higher levels of skew. The value of k for the particular workload distribution 210 shown in FIG. 2B, for example, is approximately 1.3.

Figure 2B:
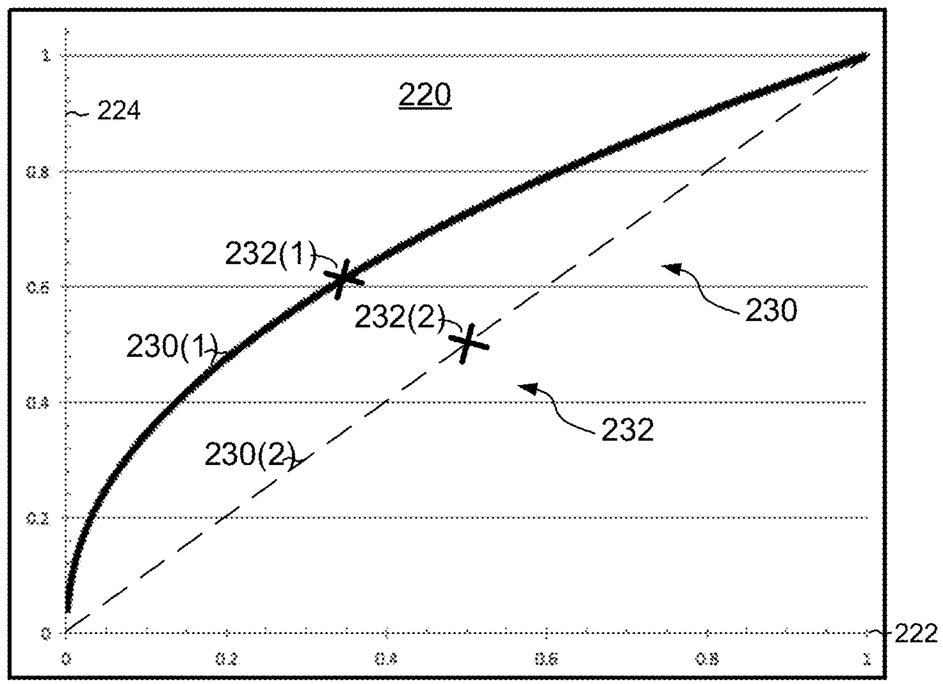
FIG. 2B is a graph showing an example relationship between cumulative percentages of IOPS and cumulative percentages of storage capacity in a data storage system.

FIG. 2B shows a graph 220 of a cumulative representation of the workload distribution 210. Units along horizontal axis 222 are the same as those shown in FIG. 2A. Values along a vertical axis 224 correspond to cumulative IOPS percentages. A skew curve 230(1) traces out a relationship between cumulative IOPS percentages and cumulative storage percentages for the same system represented by workload distribution 210. A skew curve 230(2) having no skew (k=0) is shown for comparison. Each point along either of the curves 230 relates a cumulative capacity percentage to a corresponding cumulative IOPS percentage, and vice-versa. In curve 230(1), for example, a cumulative capacity percentage of 0.5 (50%), accounts for 50% of all IOPS, as the system shown in curve 230(2) has no skew. Meanwhile, as shown in curve 230, 50% of the capacity accounts for approximately 70% of all IOPS, indicating a non-zero amount of skew. One should appreciate that a skew curve 230 may be computed as a discrete integral of curve 210 (FIG. 2A).

One may define a "skew point" 232 of a skew curve 230 as the point at which the cumulative IOPS percentage and the cumulative capacity percentage add to one. Given that total capacity is typically normalized to one (as in FIGS. 2A and 2B), the skew point may be expressed as the percent IOPS at which the sum of that percent IOPS and the corresponding percent capacity equals one. Using this definition, the skew point 232(2) of skew curve 230(2) is 50% because 50% of the IOPS are associated with 50% of the cumulative storage capacity (50%+50%=100%). Similarly, the skew point 232(1) of skew curve 230(1) is 62% because 62% of the IOPS are directed to 38% of the storage capacity (62%+38%=100%). While using this definition of the skew point to define a level of skew is convenient, it should be understood that many other definitions are suitable. Also, one should appreciate that a given skew point 232 uniquely identifies one and only one skew curve 230, which in turn uniquely identifies one and only one workload distribution 210.

Figure 3:
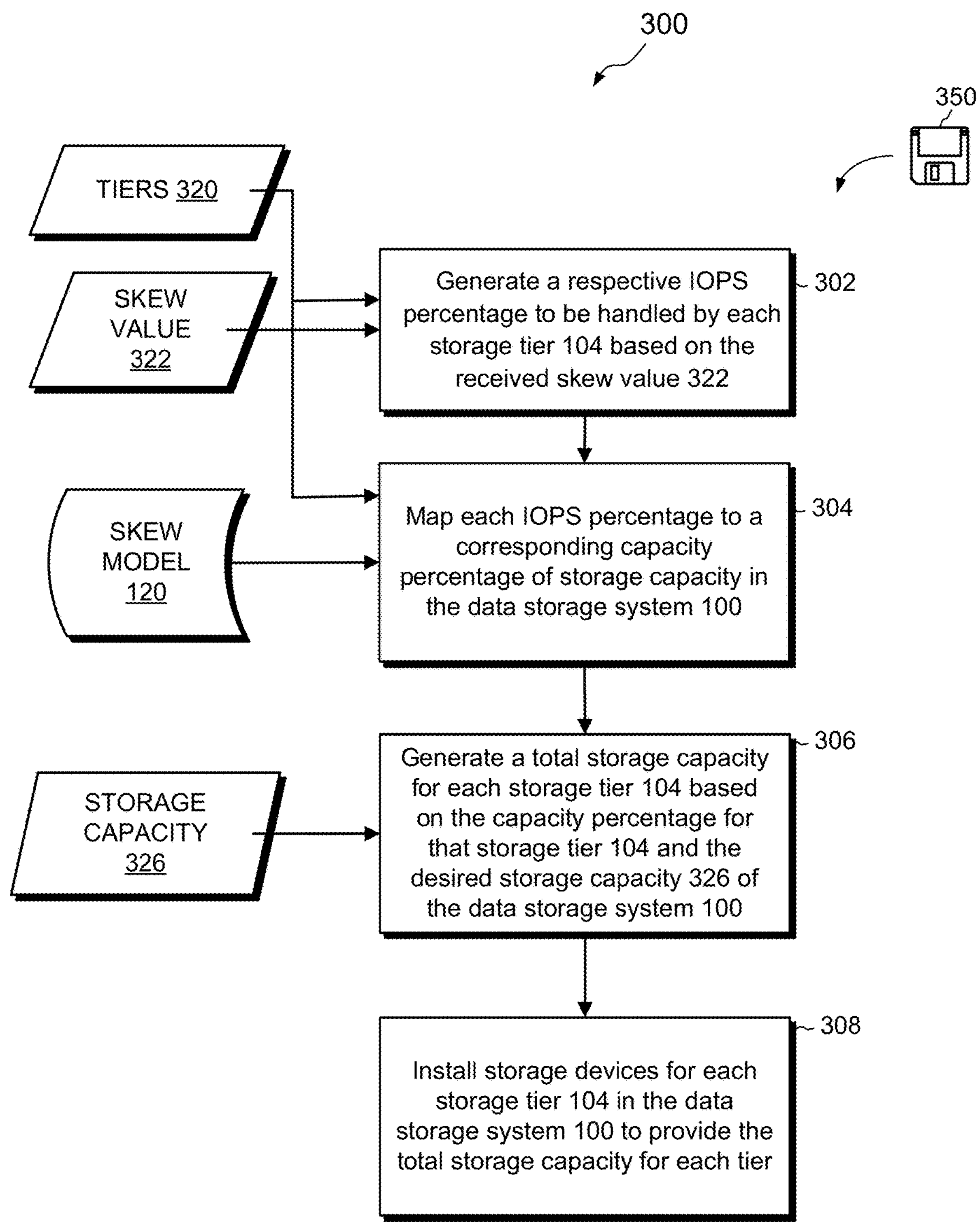
FIG. 3 is a flowchart showing an example method disclosed herein for configuring a data storage system with multiple tiers of storage.

FIG. 3 shows an example method 300 of configuring a data storage system 100. The method 300 may be carried out, for example, by the storage configuration tool 116, which resides in the memory 114 of the computing device 110 and is run by the processing circuitry 112. The method 300 contains acts 302, 304, 306, and 308. In the example shown, the method 300 has 4 inputs: a number of tiers 320, a skew value 322, the skew model 120, and a storage capacity 326.

At 302, the storage configuration tool 116 receives the number of tiers 320 of the data storage system, and the skew value 322 that describes an expected workload profile of the data storage system. The method 300 uses these inputs to determine a desired IOPS percentage for each storage tier 104 (FIG. 1).

At 304, the storage configuration tool 116 uses the skew model 120 and the skew value 322 to map the desired IOPS percentages to corresponding storage capacity percentages.

At 306, the method 300 uses the total desired storage capacity 326 of the data storage system being configured to convert the capacity percentages into storage capacities for each storage tier. For example, if the first storage tier 104(1) is assigned a capacity percentage of 10% and the storage capacity 326 is 100 terabytes, then the capacity of the first storage tier will be 10 terabytes (10% of the total capacity 326 of the system).

At 308, data storage devices are installed into the data storage system 100 for each storage tier, to match the capacities generated for each tier at 306.

In an example, mapping the desired IOPS percentages to storage capacity percentages as in step 304 includes identifying the parameter value ('k' in the relationship $y=1/x^k$) that the skew model 120 associates with the received skew value 322 and converting IOPS percentages to capacity percentages using that the skew model 120 and the parameter value 'k.'

FIG. 4 shows an example lookup table 420 which associates skew values with values for the parameter 'k'. In the example lookup table 420, the skew values are skew points 232 as defined above. As discussed above, a received skew value 322 equal to 0.50 (i.e., 50%) corresponds to a system with no skew and a parameter value of k=0. Meanwhile, a received skew value 322 of 0.55 (or 55%) corresponds to k=0.5, and a received skew value 322 of 0.77 (or 77%) corresponds to k=2.5.

FIG. 4 also shows an example matrix 430. The matrix 430 has multiple columns 434 storing IOPS percentages corresponding to respective capacity percentages 432. Each of the multiple columns 434 is associated with a respective value of the parameter 'k.' One skilled in the art will appreciate that a column of matrix 434 of matrix 430 together with the respective capacity values 432 represent points on a skew curve for a system whose skew level is described by the parameter 'k'.

Just as lookup table 420 associates a skew value of 0.50 with k=0, so the column of matrix 420 associated with k=0, represents points on a skew curve for a system with zero skew and a skew point of 50% (0.5+0.5=1). Similarly, the column of matrix 420 associated with k=0.5, represents points on a skew curve for a system with a skew point of 55% (i.e., 0.55+0.45=1). Similarly, the column of matrix 420 associated with k=2.5, represents points on a skew curve for a system with a skew point of 77% (i.e., 0.77+0.23=1).

It should be understood that all numerical values shown in FIG. 4 are for the purposes of illustration and are not necessarily precise. Along these lines, lookup table 420 has only a limited number of entries for the purposes of illustration. Similarly, matrix 430 has a limited number of rows and columns for the purposes of illustration.

In some arrangements, identifying the parameter value includes accessing a lookup table, such as the lookup table 420 shown in FIG. 4, that associates skew values with respective parameter values and selecting, as the identified parameter value, a parameter value that the lookup table associates with a skew value nearest in value to the received skew value 322.

In these arrangements the identified parameter value is used to access a matrix, such as matrix 430 shown in FIG. 4. The matrix 430 has multiple columns 434 storing respective IOPS percentages for respective capacity percentages 432. Each of the columns 434 is associated with a respective parameter value ('k'). The system then outputs, as each capacity percentage to be handled by the respective storage tier, the capacity percentage corresponding to the respective IOPS percentage from the selected column of columns 434 belonging to the matrix 430.

Figure 5:
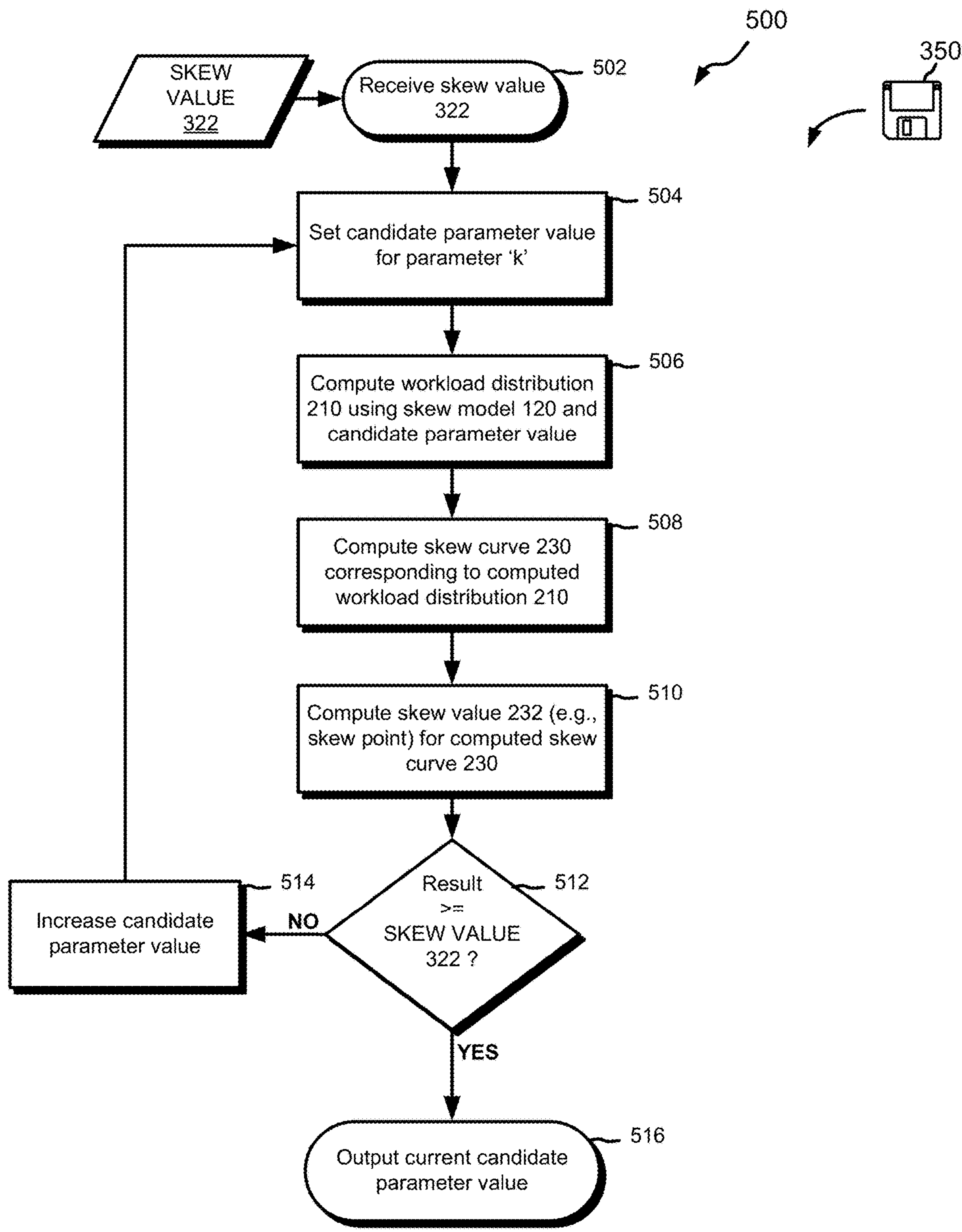
FIG. 5 is a flowchart showing an example computation process related to the example method shown in FIG. 3 and in embodiments disclosed herein.

FIG. 5 shows an example flowchart describing further elements of step 304 (FIG. 3) performed in certain arrangements. In such arrangements, as shown in FIG. 5, the parameter value ('k') is identified by means of performing a computation 500. At 502, the storage configuration tool 116 receives the skew value 322.

At 506 the storage configuration tool 116 uses the skew model 120 to calculate a workload distribution using a candidate parameter value. At 508, the calculated workload distribution is then used to calculate a skew curve 230. At 510, the storage configuration tool 116 measures the skew point (or other suitable skew value) for that curve and compares it with the received skew value 322 at 512.

If the skew point of the calculated skew curve is less than the received skew value 322, candidate parameter value is increased at 514, and the process is repeated from step 504 until the skew point of the calculated skew curve is greater or equal to the received skew value 322. Once the skew point of the calculated skew curve is greater or equal to the received skew value 322, the identified parameter value is output at 516.

The storage configuration tool 116 uses the respective IOPS percentages to be handled by each tier 104, which were previously computed at 302 (FIG. 3), to determine what capacity percentages to assign to each storage tier 104 at step 304 as shown in FIG. 3. The desired IOPS percentages to be handled by each tier 104 are determined based on the skew value 322 expected for the data storage system 100 being configured. The impact of high-performance storage relative to its cost and other characteristics (e.g., power consumption, size, reliability, etc.) will depend on the skew point 232 of the system 100. By way of example, if a particular system has a skew point of 50%, then configuring the system to have 10% of its capacity supplied by high-performance storage will only result in improved performance for 10% of the IOPS since the system has zero skew (all data accessed with uniform frequency). However, if a system has a skew point of 90%, then using high-performance storage for 10% of the capacity will result in improved performance for 90% of the IOPS. Thus the improvement expected as a result of adding more high-performance storage depends on the skew point 232 of the system 100.

Figure 6:
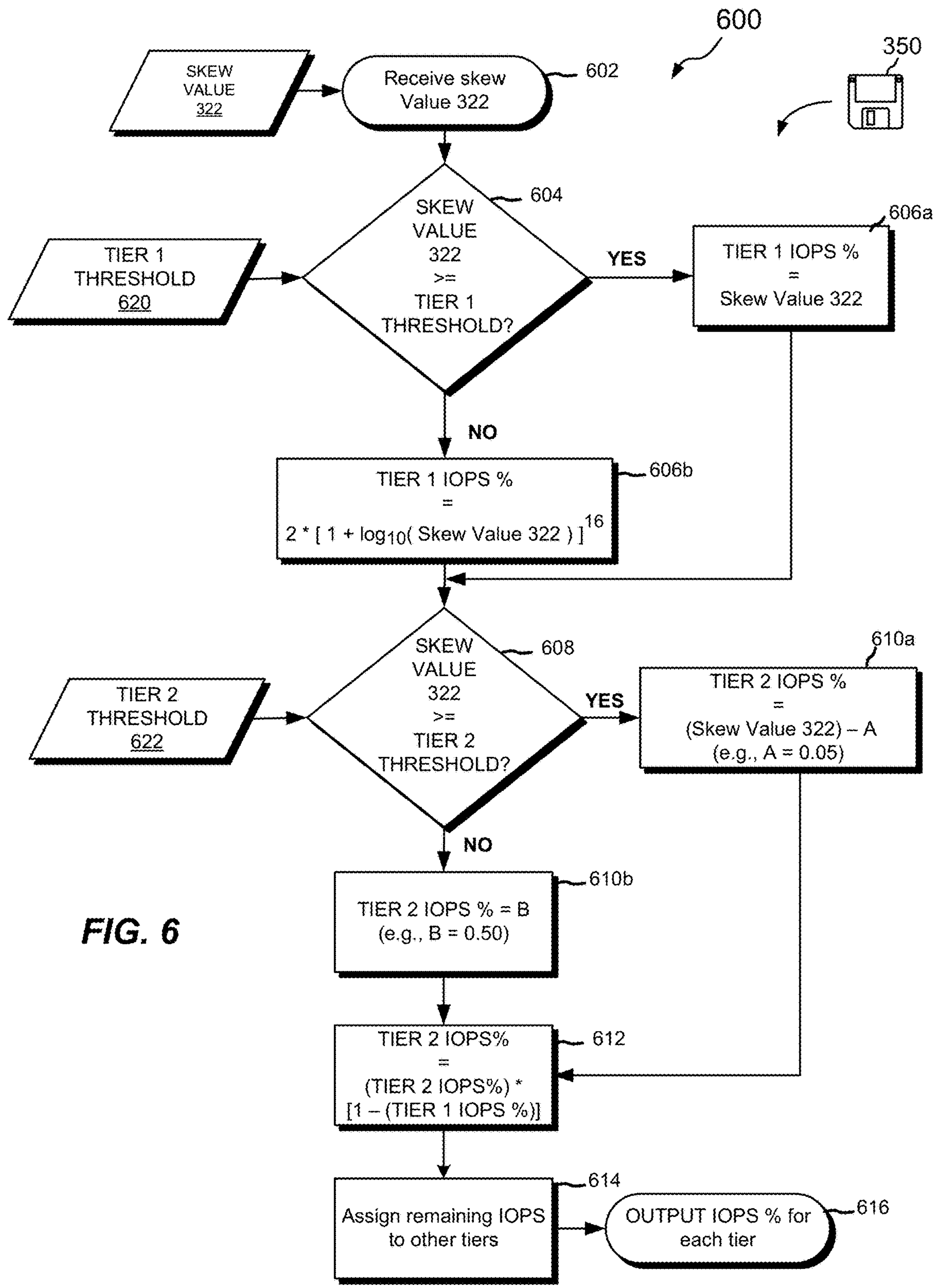
FIG. 6 is a flowchart showing another example process related to the example method shown in FIG. 3 and in embodiments disclosed herein.

FIG. 6 shows an example process 600 used in some arrangements to determine what capacity percentages to assign to each storage tier 104, as part of method 300. The process 600 contains acts 602. 604, 606(*a* and *b*), 608, 610(*a* and *b*), 612, 614, and 616. In the example shown, the method 600 has 3 inputs: the skew value 322, the threshold 620, and the threshold 622.

At 602 the process 600 receives the skew value 322 as an input. The storage configuration tool 116 tests whether the received skew value 322 is greater of equal a first threshold 622 at 604.

If the received skew value 322 is greater than the threshold 620, the storage configuration tool 116 sets the desired IOPS percentage for the first storage tier 104(1) equal to the received skew value 322 at **606*a*. Otherwise, the desired IOPS percentage for the first tier 104(1) is set equal to twice $[\log_{10}(SV)]^{16}$ where SV is the received skew value 322 at 606*b***.

After either of **606*a* and 606*b*, the process proceeds to 608 where the storage configuration tool 116 tests whether the received skew value 322 is greater or equal to the second threshold 622**.

If the received skew value 322 is greater than the second threshold 622, the storage configuration tool 116 sets the desired IOPS percentage for the first second tier 104(2) equal to the received skew value 322 minus a constant A at **610*a*. The constant A may take on different values (e.g., 0.05) in particular arrangements. Otherwise, the desired IOPS percentage for the second tier 104(2) is set equal to a constant, B at 610*b***. The constant B may take on different values (e.g., 0.50) in particular arrangements.

After either of **610*a* and 610*b*, the process proceeds to 612. At 612, the result of either of steps 610*a* and 610*b* is reduced by multiplying it by a quantity equal to (1−T) where T is the value computed for the desired IOPS percentage for the first tier 104(1) in either 606*a* or 606*b*, depending on the skew value 322**.

It should be understood that in some arrangements there is, at least, a third tier 104(3). At 614, any remaining IOPS percentage after the IOPS percentages are determined for the first and second tiers 104(1) and 104(2) are allocated to the remaining tiers. At 616 the IOPS percentages for each tier 104 are output.

Having described certain embodiments, numerous alternative embodiments or variations can be made. Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media 350 as shown, for example in FIGS. 3, 5, and 6, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of configuring a data storage system, the method comprising:

receiving (i) a skew value, the skew value based on expected workload profile of the data storage system, and (ii) a desired storage capacity of the data storage system;

generating, based on the received skew value, a respective IOPS (input-output operations per second) percentage to be handled by each of multiple storage tiers, each storage tier to be formed by a respective set of storage devices and having respective performance characteristics;

mapping each IOPS percentage to a corresponding capacity percentage of storage capacity in the data storage system;

generating a total storage capacity for each storage tier based on the capacity percentage for that storage tier and the desired storage capacity of the data storage system; and installing storage devices for each storage tier in the data storage system to provide the total storage capacity for each storage tier, wherein mapping each IOPS percentage to a corresponding capacity percentage includes providing a skew model, the skew model (i) defining a respective relationship between IOPS percentages and capacity percentages for each of multiple levels of skew and (ii) associating a respective parameter value with each of the multiple levels of skew;

identifying a parameter value that the skew model associates with the received skew value; and converting each IOPS percentage to the corresponding capacity percentage by applying the skew model with the identified parameter value.

2. A method, as in claim 1, wherein the skew model approximates data storage system skew for each parameter value as a power law relationship between incremental capacity percentages and respective IOPS percentages with capacity percentages ranked in descending order based on their respective IOPS percentages, and wherein the skew model provides a different decay rate for different parameter values.

3. A method, as in claim 2, wherein identifying the parameter value that the skew model associates with the received skew value includes accessing a lookup table that associates skew values with respective parameter values and selecting, as the identified parameter value, a parameter value that the lookup table associates with a skew value nearest in value to the received skew value;

wherein converting each IOPS percentage to the corresponding capacity percentage includes accessing a matrix having multiple columns storing respective IOPS percentages for respective capacity percentages, each of the multiple columns associated with a respective parameter value;

selecting a column of the matrix associated with the identified parameter value; and outputting, as each capacity percentage to be handled by the respective storage tier, the capacity percentage corresponding to the respective IOPS percentage from the selected column of the matrix.

4. A method, as in claim 2, wherein identifying the parameter value that the skew model associates with the skew value includes performing the following steps:

providing a candidate parameter value;

producing a computed level of skew that the skew model associates with the candidate parameter value;

testing whether the computed level of skew is at least as large as the received skew value;

repeating the providing, producing, and testing steps with incremented candidate values until the testing step determines a candidate value for which a computed level of skew is at least as large as the received skew value; and providing the determined candidate parameter value as the identified parameter value.

5. A method, as in claim 4, wherein producing the computed level of skew includes generating a cumulative skew representation for the candidate parameter value by accumulating discrete values of IOPS percentages applying the skew model with the candidate parameter, the cumulative skew relationship relating cumulative capacity percentages to respective cumulative IOPS percentages; and wherein generating the cumulative skew relationship includes:

computing an integral of the respective relation between IOPS percentages to capacity percentages for the identified parameter value.

6. A method, as in claim 1, wherein the multiple storage tiers include a first storage tier and a second storage tier;

wherein a first rule provides a first desired IOPS percentage, representing the IOPS percentage to be handled by the first storage tier based on the received skew value; and wherein a second rule provides a second desired IOPS percentage representing the IOPS percentage to be handled by the second storage tier based on the first desired percentage and the received skew value.

7. A method, as in claim 6, wherein producing the first desired IOPs percentage includes:

for a received skew value within a first range of values, providing, as the first desired IOPS percentage, a percentage less than the received skew value; and for a received skew value within a second range of values, providing, as the first desired IOPS percentage, a percentage equal to the received skew value;

wherein every value of the second range is larger than every value of the first range;

wherein, when the received skew value is closer to a minimum value of the first range of values than to a maximum value, the first desired IOPS percentage increases less rapidly for an increased value of the received skew; and wherein, when the received skew value is closer to the maximum value of the first range of values than to the minimum value, the first desired IOPS percentage increases more rapidly for an increased value of the received skew value near the maximum value.

8. A method, as in claim 7, wherein the method includes:

when the received skew value is within the first range of values, providing, as the first desired IOPS percentage, a value proportional to a quantity consisting of a sum raised to an exponent value, the sum consisting of a logarithm of the received skew value and a constant; and when the received skew value is within the second range of values of the received skew value, every value of the second range being larger than every value of the first range, providing, as the first desired IOPS percentage, a percentage equal to the received skew value.

9. A method, as in claim 8, wherein producing the first desired IOPs percentage further includes selecting as the value proportional to the quantity a value equal to twice the quantity, selecting sixteen as the exponent value, selecting, as the logarithm, a base-10 logarithm; and, when the received skew value is expressed as a percentage value between 50 and 100, selecting, as the constant, negative one.

10. A method, as in claim 8, wherein producing the second desired IOPs percentage includes:

when the received skew value greater than or equal to a predetermined threshold, providing, as the second desired IOPS percentage, a value equal to the received skew value minus a first predetermined percentage multiplied by a quantity equal to one minus the first desired IOPS percentage; and when the received skew value is less than the threshold, providing, as the second desired IOPS percentage, a second predetermined percentage multiplied by a quantity equal to one minus the first desired IOPS percentage.

11. A method, as in claim 10, wherein the multiple tiers include a third tier;

wherein generating the respective IOPS percentages to be handled by each of the storage tiers further includes, after generating the first desired IOPS percentage for the first tier and the second desired IOPS percentage for the second tier, generating a third desired IOPS percentage to be handled by at least one remaining tier; and wherein the sum of the first, second, and third desired IOPS percentages is equal to one hundred percent.

12. A computer program product including a set of non-transitory, computer-readable media having instructions which, when executed by control circuitry of a computing device, cause the control circuitry to perform a method for configuring a data storage system, the method comprising:

receiving (i) a skew value, the skew value based on expected workload profile of the data storage system, and (ii) a desired storage capacity of the data storage system;

generating, based on the received skew value, a respective IOPS (input-output operations per second) percentage to be handled by each of multiple storage tiers, each storage tier to be formed by a respective set of storage devices and having respective performance characteristics;

mapping each IOPS percentage to a corresponding capacity percentage of storage capacity in the data storage system;

generating a total storage capacity for each storage tier based on the capacity percentage for that storage tier and the desired storage capacity of the data storage system; and outputting configuration instructions to install storage devices for each storage tier in the data storage system to provide the total storage capacity for each storage tier, wherein mapping each IOPS percentage to a corresponding capacity percentage includes providing a skew model, the skew model (i) defining a respective relationship between IOPS percentages and capacity percentages for each of multiple levels of skew and (ii) associating a respective parameter value with each of the multiple levels of skew;

identifying a parameter value that the skew model associates with the received skew value; and converting each IOPS percentage to the corresponding capacity percentage by applying the skew model with the identified parameter value.

13. A computer program product, as in claim 12, wherein the skew model approximates data storage system skew for each parameter value as a power law relationship between incremental capacity percentages and respective IOPS percentages with capacity percentages ranked in descending order based on their respective IOPS percentages, and wherein the skew model provides a different decay rate for different parameter values.

14. A computer program product, as in claim 13, wherein identifying the parameter value that the skew model associates with the received skew value includes accessing a lookup table that associates skew values with associated parameter values and selecting, as the identified parameter value, a parameter value that the lookup table associates with a skew value nearest in value to the received skew value, and wherein converting each IOPS percentage to the corresponding capacity percentage includes accessing a matrix having multiple columns storing respective IOPS percentages for respective capacity percentages, each of the multiple columns associated with a respective parameter value;

selecting the column of the matrix associated with the identified parameter value; and outputting, as each capacity percentage to be handled by the respective storage tier, the capacity percentage corresponding to the respective IOPS percentage from the selected column of the matrix.

15. A computer program product, as in claim 13, wherein identifying the parameter value that the skew model associates with the skew value includes performing the following steps:

providing a candidate parameter value;

producing a computed level of skew that the skew model associates with the candidate parameter value;

testing whether the computed level of skew is at least as large as the received skew value;

repeating the providing, producing, and testing steps with incremented candidate values until the testing step determines a candidate value for which a computed level of skew is at least as large as the received skew value; and providing the determined candidate parameter value as the identified parameter value;

wherein producing the computed level of skew includes generating a cumulative skew representation for the candidate parameter value by accumulating discrete values of IOPS percentages applying the skew model with the candidate parameter, the cumulative skew relationship relating cumulative capacity percentages to respective cumulative IOPS percentages; and wherein generating the cumulative skew relationship includes computing an integral of the respective relation between IOPS percentages to capacity percentages for the identified parameter value.

16. A computer program product, as in claim 12, wherein the multiple storage tiers include a first storage tier and a second storage tier;

wherein a first rule provides a first desired IOPS percentage, representing the IOPS percentage to be handled by the first storage tier based on the received skew value;

wherein a second rule provides a second desired IOPS percentage representing the IOPS percentage to be handled by the second storage tier based on the first desired percentage and the received skew value;

wherein producing the first desired IOPs percentage includes:

for a received skew value within a first range of values, providing, as the first desired IOPS percentage, a percentage less than the received skew value; and for a received skew value within a second range of values, providing, as the first desired IOPS percentage, a percentage equal to the received skew value;

wherein every value of the second range is larger than every value of the first range;

wherein, when the received skew value is closer to a minimum value of the first range of values than to a maximum value, the first desired IOPS percentage increases less rapidly for an increased value of the received skew; and wherein, when the received skew value is closer to the maximum value of the first range of values than to the minimum value, the first desired IOPS percentage increases more rapidly for an increased value of the received skew value near the maximum value.

17. A computer program product, as in claim 16, wherein the method includes:

when the received skew value is within the first range of values, providing, as the first desired IOPS percentage, a value proportional to a quantity consisting of a sum raised to an exponent value, the sum consisting of a logarithm of the received skew value and a constant; and when the received skew value is within the second range of values of the received skew value, every value of the second range being larger than every value of the first range, providing, as the first desired IOPS percentage, a percentage equal to the received skew value.

18. A computer program product, as in claim 17, wherein producing the second desired IOPs percentage includes:

when the received skew value greater than or equal to a predetermined threshold, providing, as the second desired IOPS percentage, a value equal to the received skew value minus a first predetermined percentage multiplied by a quantity equal to one minus the first desired IOPS percentage; and when the received skew value is less than the threshold, providing, as the second desired IOPS percentage, a second predetermined percentage multiplied by a quantity equal to one minus the first desired IOPS percentage.

* * * * *